Feb. 19, 1924. 1,484,290
F. W. BIRTCH
VALVE OR GAS COCK
Filed Oct. 19, 1922
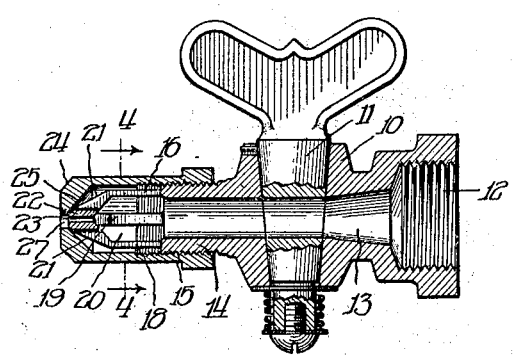
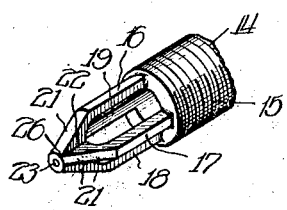
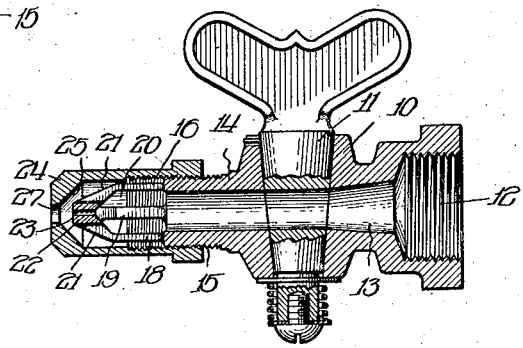
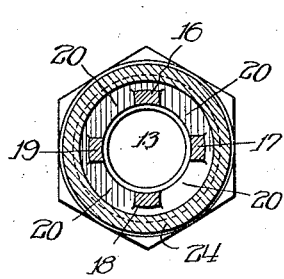
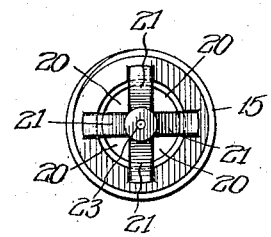
Witness:
A. Burkhardt
Inventor:
Fred W. Birtch,
By Harvey L. Hanson
Attorney Patented Feb. 19, 1924.

1,484,290

UNITED STATES PATENT OFFICE.

FRED W. BIRTCH, OF LAPORTE, INDIANA, ASSIGNOR TO BASTIAN-MORLEY CO., OF LAPORTE, INDIANA, A CORPORATION OF INDIANA.

VALVE OR GAS COCK.

Application filed October 19, 1922. Serial No. 595,619.

*To all whom it may concern:*

Be it known that I, FRED W. BIRTCH, citizen of the United States, residing at Laporte, in the county of Laporte and State of Indiana, have invented a certain new and useful Improvement in Valves or Gas Cocks, of which the following is a full, clear, concise, and exact description, reference being had to the accompanying drawings, forming a part of this specification.

The invention relates to valves, or gas cocks, adapted to be connected with a gas supply for furnishing gas to the burners of hot water heaters, ranges, industrial appliances, and other devices.

The prime object of the invention is the provision of a construction whereby the discharge of the gas may be varied and regulated as desired without interfering with or changing the nozzle velocity thereof. By means of the invention constant nozzle velocity of the gas may be secured.

It is another object of the invention to provide the casing of the gas cock with a branch which is constructed in such a manner as to permit the free and unobstructed passage of the gas through it and to construct a part of the branch in such a manner that a movable cap or thimble may be adjustably arranged on the branch and may be actuated to cooperate with the specially constructed branch to regulate the discharge of the gas through said gas cock and to secure a maximum velocity of gas.

It is a further object of the invention to provide a construction wherein the number of parts employed is reduced to a minimum and which may be manufactured at a low cost.

In the structure illustrated in the drawings, the valve casing is provided with a tubular projection or branch formed to provide fingers which are spaced apart from each other affording passages for the gas, so that the gas may pass from the interior to the exterior of the tubular portion.

The extremities of these spaced fingers furthest away from the main body of the gas cock are all connected together, and this end is formed to produce a conical shaped extremity or nozzle having an aperture arranged therein, which is in substantial registry and alignment with the bore of the tubular extension or branch.

That portion of the material forming the conical shaped extremity or nozzle, which is disposed between each of the fingers, is cut away, so that the gas may flow unimpeded outwardly through the cut-away openings arranged immediately adjacent the rear of the end of the conical shaped extremity or nozzle. These, preferably four, spaces between the outer ends of the projections, or fingers, communicate with the gas passage in the interior of the tubular extension or branch of the valve casing.

The conical shaped end of the tubular branch projects a slight distance beyond the outer termination of the cut-out openings arranged between each of the fingers and provides a seat for an adjustable cap or thimble, the inner end of which is screw threaded and arranged upon the tubular branch. This thimble is provided with an aperture which cooperates with the conical shaped end seat portion to regulate the flow of gas through said tubular branch. The thimble is also provided with an inner wall having a conical face adjacent the aperture in the end of the thimble.

The invention will be described in detail and more readily understood when read in conjunction with the accompanying drawings in which one embodiment of the invention is illustrated, it being obvious that changes and modifications may be made without departing from the spirit of the appended claims forming a part hereof.

In the drawings:

Figure 1 is a longitudinal section of a gas-cock embodying the invention.

Figure 2 is a view similar to Figure 1, showing the elements employed in the structure in changed position.

Figure 3 is a perspective view, partly broken away, of the branch of the gas-cock illustrated in Figures 1 and 2, showing the fingers and their ends forming the nozzle end.

Figure 4 is an enlarged section taken on line 4—4 of Figure 1.

Figure 5 is a front end elevation of the branch illustrated in Figure 3.

The gas-cock, as shown in the drawings, embodies a valve casing 10 and a tapered control valve 11 with a suitable operating handle which is suitably retained in position in the casing. The casing 10 is provided with the threaded gas inlet opening 12, in which a gas supply pipe (not shown)

may be attached or arranged in operative relation.

The valve casing 10 is provided with a gas passage 13 and is also provided with a tubular outlet branch 14 having the threaded part 15. The outer portion of the tubular extension or branch 14 is formed to provide the plurality of fingers 16, 17, 18, and 19 which are separated and spaced apart from each other to produce the plurality of openings 20 between them.

The outer faces of the outer ends of the fingers 16, 17, 18, and 19 converge and are formed to provide the plurality of inclined surfaces 21. The extreme ends of the fingers 16, 17, 18, and 19 are connected together by the material designated 22, which is provided with an aperture 23 to permit the gas flowing through the passage 13 and the openings 20 to at all times escape therefrom when the valve is in an open condition and the internally screw threaded thimble or cap 24 has been rotated on the screw threaded portion 15, so that the inclined, inner face 25 of the thimble or cap is away from the material designated 22.

By referring particularly to Figures 3 and 5, it will be noted that the conical shaped end portion of the branch 14 is devoid of material between the converging portions of the fingers 16, 17, 18, and 19, with the exception of a relatively small area designated 26, which is left intact. This last mentioned area is formed in the manner so as to provide a seat, with which the inclined, inner face 25 of the thimble adjacent the aperture 27, which is provided in one end of the adjustable thimble may cooperate to regulate and control the volume of the gas which may flow from the aperture 27 of the thimble as the thimble is moved and adjusted along the branch 14. The aperture 23 is constructed to permit a restricted flow of gas therethrough when the inclined, inner face 25 is in contact with the seat 26, but the aperture 27 of the thimble is constructed to permit the full, unimpeded flow of gas therethrough when the thimble has been rotated outwardly on the threaded portion 15, so that the inclined face 25 is away from the seat 26.

By referring particularly to Figures 1 and 2, it will be noted that the interior of the thimble is in spaced relation to the outer surfaces of the fingers 16, 17, 18, and 19, and, therefore, the gas has free passage around the fingers and through the space provided between said fingers as the gas flows through the passage 13 and the openings 20 of the valve casing 10.

It is further manifest that the gas may freely flow between the spaces provided between the rigid fingers at the cone shaped end and that, as the thimble is adjusted along the tubular branch, the discharge of the gas may be regulated without varying the velocity thereof.

Having thus described the invention, what I claim and desire to secure by Letters Patent is:

1. In a gas regulating valve, the combination of a casing, a valve arranged in the casing, said casing being provided with an extension having a passage controlled by said valve, the end of the extension being provided with a plurality of separated, substantially parallel fingers, one end of each of said fingers being connected together and terminating in a conical shaped end portion, the conical shaped end portion being formed to provide a gap between said fingers, which extends to a point within the diameter of said passage and said end portion, having an aperture which is arranged in substantial alignment with said valve controlled passage, said extension being threaded, a thimble arranged upon the threaded portion, said thimble being adjustable and in spaced relation to the extension, an aperture provided in said thimble, said last mentioned aperture being arranged to cooperate with the conical shaped end portion of the extension to regulate the flow of gas through the aperture in said thimble.

2. In a gas regulating valve, the combination of a casing, a valve arranged in the casing, said casing being provided with an extension having a passage controlled by said valve, the end of the extension being provided with a plurality of rigid, separated, substantially parallel fingers, one end of each of said fingers being connected together and terminating in a conical shaped end portion having an aperture which is arranged in substantial alignment with said valve controlled passage, said extension being threaded, a thimble arranged upon the threaded portion, said thimble being adjustable and in spaced relation to the extension, an aperture provided in said thimble, said last mentioned aperture being arranged to cooperate with the conical shaped end portion of the extension to regulate the flow of gas through the aperture in said thimble and the space between said fingers at the conical shaped end portion terminating adjacent the aperture in said thimble, and being in substantial alignment therewith.

3. In a gas regulating valve, the combination of a casing, a valve arranged in the casing, said casing being provided with an extension having a passage controlled by said valve, the end of the extension being provided with a plurality of integral, rigid, separated, substantially parallel fingers, one end of each of said fingers being connected together and terminating in a conical shaped end portion, the space between said fingers at the conical shaped end portion terminating in substantial alignment with the passage in said casing and said conical shaped end portion, having an aperture which is arranged in substantial alignment with said valve controlled passage, said extension being threaded, a thimble arranged upon the threaded portion, said thimble being adjustable and in spaced relation to the extension, an aperture provided in said thimble, said last mentioned aperture being arranged to cooperate with the conical shaped end portion of the extension to regulate the flow of gas through the aperture in said thimble.

4. In a gas regulating valve, the combination of a casing, a valve arranged in the casing, said casing being provided with an extension having a passage controlled by said valve, the end of the extension being provided with a plurality of separated, substantially parallel fingers, one end of each of said fingers being connected together and terminating in a conical shaped end portion, the conical shaped end portion being formed to provide a gap between said fingers, said gap terminating at one extremity in substantial alignment with the passage in said casing, said conical shaped end portion, having an aperture which is arranged in substantial alignment with said valve controlled passage, the material of the conical shaped portion between said fingers being formed to provide a passage, said extension being threaded, a thimble arranged upon the threaded portion, said thimble being adjustable and in spaced relation to the extension, an aperture provided in said thimble, said last mentioned aperture being arranged to cooperate with the conical shaped end portion of the extension to regulate the flow of gas through the aperture in said thimble.

In witness whereof, I hereunto subscribe my name this 4 day of October, A. D. 1922.

FRED W. BIRTCH.